United States Patent [19]

Turlej

[11] 4,366,426

[45] Dec. 28, 1982

[54] STARTING CIRCUIT FOR SINGLE PHASE ELECTRIC MOTORS

[75] Inventor: Zbigniew W. Turlej, Mississauga, Canada

[73] Assignee: S.A. Armstrong Limited, Toronto, Canada

[21] Appl. No.: 299,716

[22] Filed: Sep. 8, 1981

[51] Int. Cl.³ .............................................. H02P 1/42
[52] U.S. Cl. ..................................... 318/786; 318/785
[58] Field of Search ........................ 318/786, 787, 785

[56] References Cited

U.S. PATENT DOCUMENTS

| | | | |
|---|---|---|---|
| 3,671,830 | 6/1972 | Kruper | 318/786 |
| 3,740,631 | 6/1973 | Fricker et al. | 318/787 |
| 3,819,994 | 6/1974 | Ballman | 318/786 |
| 3,819,995 | 6/1974 | Ballman | 318/786 |

Primary Examiner—David Smith, Jr.
Attorney, Agent, or Firm—Ridout & Maybee

[57] ABSTRACT

A time responsive switching circuit for use with a single phase alternating current motor comprises a Triac in series with a start winding of the motor and controlled so as to disconnect the start winding after a predetermined time delay. The Triac is controlled by a timing circuit comprising a full wave rectifier bridge energized from the alternating current source, an RC charging network connected across the d.c. terminals of the bridge, a CMOS switching device responsive to the condition of the charging circuit, and an SCR controlled by the CMOS switching device. The SCR is switched off by the CMOS switching device after the chosen delay so as to remove the control potential from the Triac and so switch off the latter.

6 Claims, 1 Drawing Figure

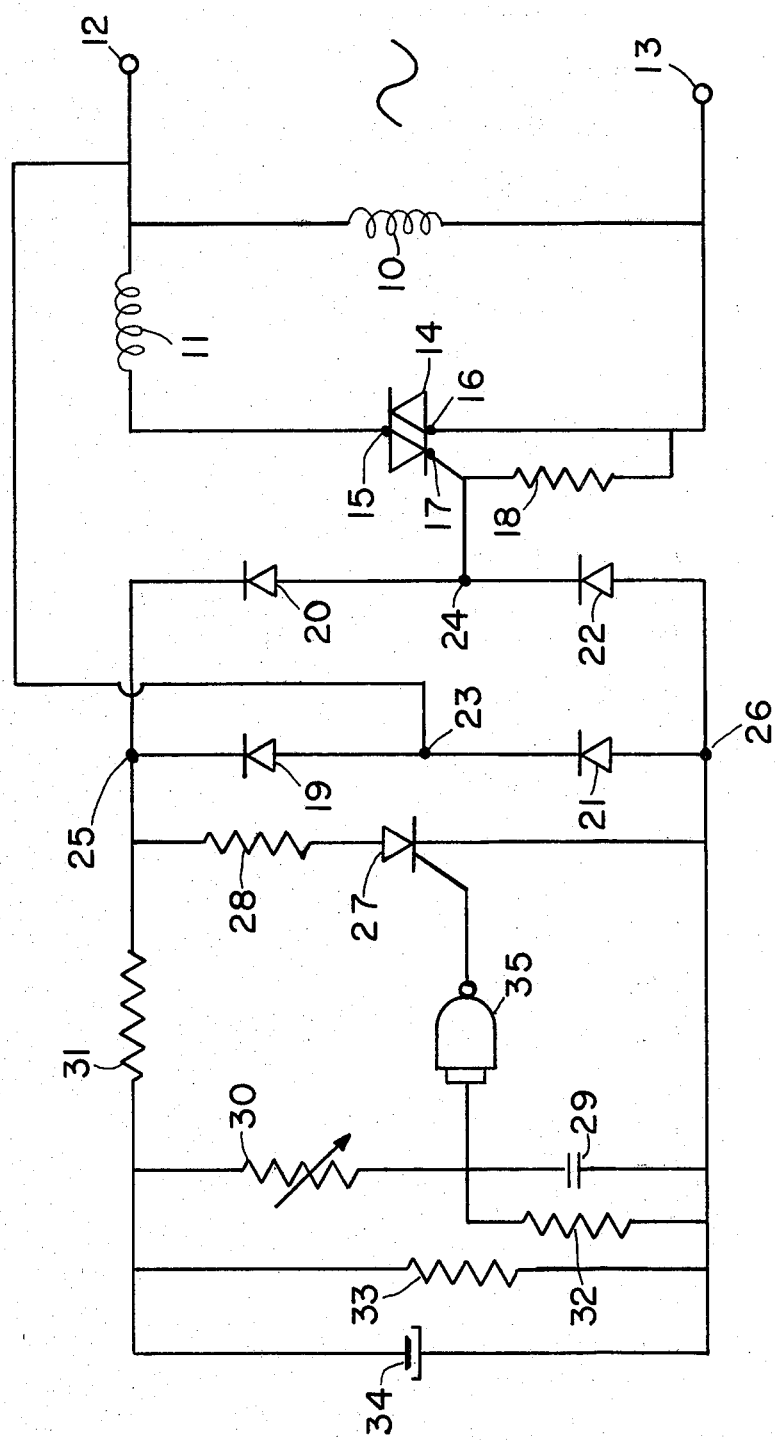

STARTING CIRCUIT FOR SINGLE PHASE ELECTRIC MOTORS

This invention relates to starting systems for single phase alternating current electric motors. The invention is especially applicable to the starting of electric motors of domestic water pumps, jet pumps, refrigerator compressors, air conditioners, humidifiers and the like, which may need to be restarted after short intervals. Such motors are typically of from 1/12 horse power to three horse power.

In the case of a single phase motor it is standard practice to provide a start winding in addition to the main run winding in order to provide starting torque when the motor is first switched on. The start winding is switched out of circuit once the desired speed is reached, and various kinds of switching devices have been developed for this purpose. One such device employs a centrifugual switch which is responsive to motor speed, but a disadvantage of centrifugal switches is that they are not suitable for use with small motors in applications where space is limited. Other devices employ PTC (positive temperature coefficient) switches, but these cannot be used for instantaneous restarting of motors since, being temperature dependent, they cannot be reset until they have cooled sufficiently from the preceding cycle.

In order to deal with these problems attempts have been made to utilize solid state circuitry in conjunction with time responsive circuits such as RC networks, but such attempts have hitherto been unsuccessful. The prior art solid state circuits are not instantaneously resettable in practice, for their timing is inherently dependent upon the characteristics of the individual components which are unstable and vary considerably.

It is an object of the present invention to provide an improved starting system whose switching circuit, while employing solid state devices, is for all practical purposes instantaneously resettable.

According to the invention there is provided a time responsive switching circuit for use with a single phase alternating current motor having a start winding and a run winding, the circuit comprising essentially a solid state bilateral switching device such as a Triac whose main terminals are connected in series with the start winding and whose control terminal is connected to a timing circuit which becomes operable when the motor is started and which switches off the Triac after a predetermined time. The timing circuit basically comprises a full wave rectifier bridge to which an alternating voltage is applied concurrently with switching on the motor, an SCR connected across the direct current terminals of the bridge, a charging circuit comprising a capacitor and a resistor connected in series across the direct current terminals of the bridge, and a trigger device connected between the common junction and the capacitor and resistor and the gate of the SCR. The trigger device is preferably a CMOS inverter, whose gate terminal does not draw current and so does not affect timing. In operation, when the motor is first switched on, the Triac conducts and will remain conducting so long as the SCR is conducting. When the capacitor has charged to the threshold voltage of the trigger device, however, the SCR is cut off at the end of the current half cycle of current, and thus the Triac is switched off thereby to cut out the start winding of the motor.

One starting system in accordance with the invention is illustrated by way of example in the accompanying drawing.

Referring to the drawing, a single phase alternating current electric motor has a run winding 10 and a start winding 11, these windings being connected between a pair of motor terminals 12, 13 which are adapted to be connected to a suitable alternating current source. Connected in series with the start winding 11 is a solid state bilateral switching device, in this case a Triac 14. The Triac 14 has a pair of main terminals 15, 16 connected directly in series with the start winding across the a.c. source, and a control terminal 17 which is connected to the motor terminal 13 via a resistor 18, of nominal value 220 ohms, and which is also connected to a timing circuit as will now be described.

The timing circuit comprising essentially a full wave rectifier bridge circuit, an SCR switching circuit energized from the bridge circuit, a RC charging network, and a two-state trigger device responsive to the CR charging circuit for controlling the potential on the gate of the SCR. The bridge circuit comprises four diodes 19, 20, 21, 22 connected to provide a pair of a.c. input terminals 23, 24 and a pair of d.c. output terminals 25, 26. The input terminal 23 is connected directly to the motor terminal 12 while the input terminal 24 is connected to the control terminal 17 of the Triac 14, and therefore to the motor terminal 13 via resistor 18. Thus, when the motor is switched on, alternating current is applied to the bridge and a full wave rectified voltage appears at the bridge output terminals 25, 26. The SCR switching circuit comprises an SCR 27 connected in series with a resistor 28, of nominal value 3 kilohm, across the bridge terminals 25, 26. The polarity of the SCR is, of course, such that it can conduct when supplied by the bridge.

The charging circuit comprises a capacitor 29 in series with a resistor 30 connected across the d.c. terminals 25, 26 of the rectifier bridge. The values of capacitor 29 and resistor 30 are chosen according to the desired timing characteristics, but typically these may be 0.1 microfarad and 2 megohm, respectively. The resistor 30 is preferably variable to provide for adjustment of the time constant.

In the particular circuit shown the charging circuit is actually connected across a resistor 33 of a potential divider 31, 33 in circuit with the d.c. terminals of the bridge, a smoothing capacitor 34 being connected across the resistor 33. Typical values of the resistors 31 and 33 and the capacitor 34 are 100 kilohm, 10 kilohm, and 1 microfarad, respectively. A bleed resistor of 8.2 megohm is connected across the capacitor 29 of the charging circuit.

The trigger device consists of a CMOS inverter 35 connected between the common junction of capacitor 29 and resistor 30 and the gate of the SCR 27. The advantage of selecting a CMOS inverter for this purpose is that its gate does not draw current in a manner to affect the timing of the circuitry.

In operation of the system, when the motor is switched on the Triac 14 conducts and so current will flow through the start winding 11 as well as the run winding 10. This happens because the rectifier bridge is energized and, since the gate of the SCR is high, the SCR will conduct so that a control current is applied to the Triac. As the voltage across capacitor 29 reaches a predetermined value after a time delay depending upon the time constant of the charging circuit, the CMOS inverter is triggered and so the gate of the SCR becomes low. The SCR will therefore become non-conductive at the end of the current half cycle, and in consequence the Triac will be switched off.

It will be appreciated that although the circuit has been described in terms of discrete solid state components, it can advantageously be implemented by means of integrated circuitry. The switching circuit is compact, having no moving parts, and is useful in applications where space is confined. Moreover, unlike PTC switches which are temperature dependent, it permits instantaneous restarting of the motor, a most important advantage in applications where rapid cycling of motors is a major consideration.

What I claim is:

1. A time-responsive switching circuit for use with a single phase alternating current electric motor having a start winding and a run winding connected across a pair of first and second supply terminals, comprising:
    a solid state bilateral switching device adapted to be connected in series with said start winding, said device having first and second main terminals for connection respectively to start winding and to said second supply terminal, and a control terminal connected through an impedance to said second main terminal,
    a full wave rectifier bridge having a pair of a.c. terminals and a pair of d.c. terminals, one a.c. terminal being connected to said control terminal of the solid state bilateral switching device,
    circuit means for connecting the other a.c. bridge terminal to said first supply terminal,
    an SCR connected across said d.c. bridge terminals to conduct current supplied by the rectifier bridge, the SCR having a gate,
    a charging circuit consisting of a capacitor and a resistor connected in series across said d.c. bridge terminals, the charging circuit having a time constant defining a predetermined time delay,
    a two-state trigger device connected between the common junction of the capacitor and resistor of the charging circuit and the gate of the SCR,
    said trigger device applying a trigger voltage to the gate of the SCR, and
    said trigger device being responsive to charging of the capacitor of said charging circuit to a predetermined level for disconnecting the trigger voltage from the gate of the SCR, thereby to render the SCR non-conducting and so switch off the solid state bilateral switching device.

2. A time responsive switching circuit according to claim 1, wherein the solid state bilateral switching device is a Triac.

3. A time responsive switching circuit according to claim 1, wherein the trigger device is a CMOS inverter.

4. A time responsive switching circuit according to claim 1, wherein the resistor of said charging circuit is a variable resistor adjustable for adjusting the time constant of the circuit within predetermined limits.

5. In combination with a single phase alternating current electric motor having a start winding and a run winding connected between first and second supply terminals, a time responsive switching circuit comprising:
    a triac connected in series with said start winding, the triac having first and second main terminals connected respectively to said start winding and to said second supply terminal, and a control terminal connected through a resistor to said second main terminal,
    a full wave rectifier bridge having a pair of a.c. terminals and a pair of d.c. terminals, said a.c. terminals being connected respectively to said first supply terminal and to said control terminal,
    an SCR connected acrss said d.c. terminals in conductive relation to the rectifier bridge, the SCR having a gate,
    a timing circuit comprising a resistor connected in series with a capacitor across said d.c. bridge terminals, the timing circuit having a time constant defining a predetermined time delay,
    a CMOS switching device connected between the common junction of said resistor and capacitor of the timing circuit and the gate of the SCR, the CMOS switching device being connected to said d.c. bridge terminals through said timing circuit for applying a trigger voltage to the gate of the SCR,
    the CMOS switching device being responsive to charging of the capacitor to a predetermined voltage level for disconnecting the trigger voltage from said gate thereby to render the SCR non-conductive and so switch off the triac.

6. A time responsive switching circuit according to claim 5, wherein the resistor of said timing circuit is a variable resistor adjustable for adjusting the time constant of the circuit within predetermined limits.

* * * * *